United States Patent [19]
Becker et al.

[11] Patent Number: 5,183,377
[45] Date of Patent: Feb. 2, 1993

[54] GUIDING A ROBOT IN AN ARRAY

[75] Inventors: Eberhard Becker, Hagen; Franz Schulte, Sudern; Hartwig Sprung; Ronald Staggl, both of Wetter; Manfred Stoeber, Witten, all of Fed. Rep. of Germany

[73] Assignee: Mannesmann AG, Düsseldorf, Fed. Rep. of Germany

[21] Appl. No.: 359,083

[22] Filed: May 30, 1989

[30] Foreign Application Priority Data

May 31, 1988 [DE] Fed. Rep. of Germany ....... 3818757

[51] Int. Cl.$^5$ ............................................. B25J 17/00
[52] U.S. Cl. .................................. 414/751; 212/218; 403/231; 901/16
[58] Field of Search ................ 414/751-753; 901/16; 104/107, 106, 250, 246, 89; 211/182; 248/279; 212/218; 403/403, 231; 52/72; 198/860.2; 105/163.1

[56] References Cited

U.S. PATENT DOCUMENTS

| | | | |
|---|---|---|---|
| 625,427 | 5/1899 | Stewart, Jr. et al. | 52/702 |
| 3,884,363 | 5/1975 | Ajlouny | 901/16 X |
| 4,181,292 | 1/1980 | Hubel | 403/232.1 |
| 4,893,961 | 1/1990 | O'Sullivan et al. | 403/403 X |

FOREIGN PATENT DOCUMENTS 2288700 5/1976 Fed. Rep. of Germany ...... 212/218
3504233 11/1986 Fed. Rep. of Germany.

Primary Examiner—Michael S. Huppert
Assistant Examiner—Donald W. Underwood
Attorney, Agent, or Firm—R. H. Siegemund

[57] ABSTRACT

A two-dimensional mounting structure for an industrial robot or robot manipulator on a carriage with a lifting post and a manipulator connected to the post, the mounting structure includes longitudinal rail carriers, transverse connectors and a movable rail, carriages are connected to the movable rail which runs on the longitudinal carriers, the carriage for the robot runs on the movable rail; the improvement includes essentially similarly constructed end elements, first ones of the end elements connecting the ends of the longitudinal carriers to ends of the transverse connectors, others of the end elements connecting respective two ends of the movable rail to carriage means by means of which the transverse rail carrier runs on the longitudinal carrier; each end element comprises a basic configuration that includes two flat plates and a shaft in the bores with aligned bores, a connecting plate interconnecting the two plates from which they extend in downward direction, for connection to a transverse connector or a carriage, a lateral bar extending upright from said connecting plate parallel to an axis of the aligned bores for connection to the front end of a longitudinal rail carrier or a movable rail.

9 Claims, 4 Drawing Sheets

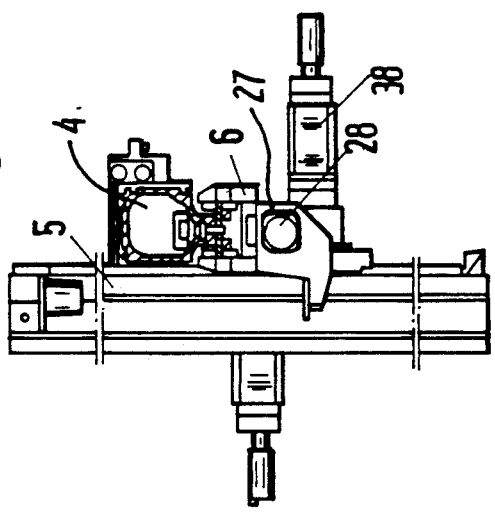
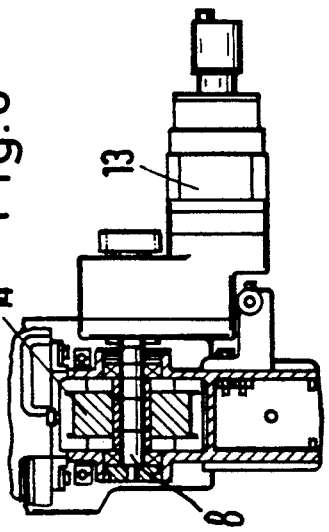
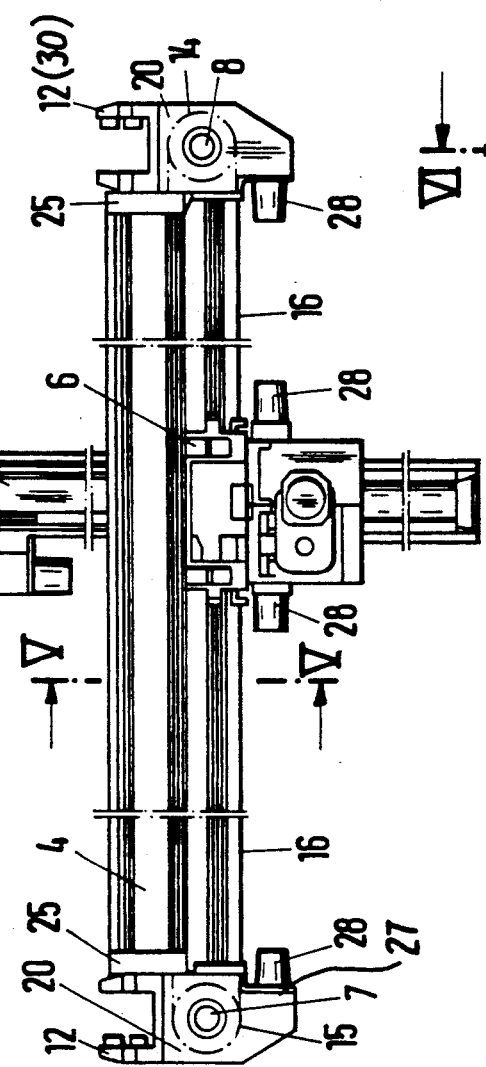
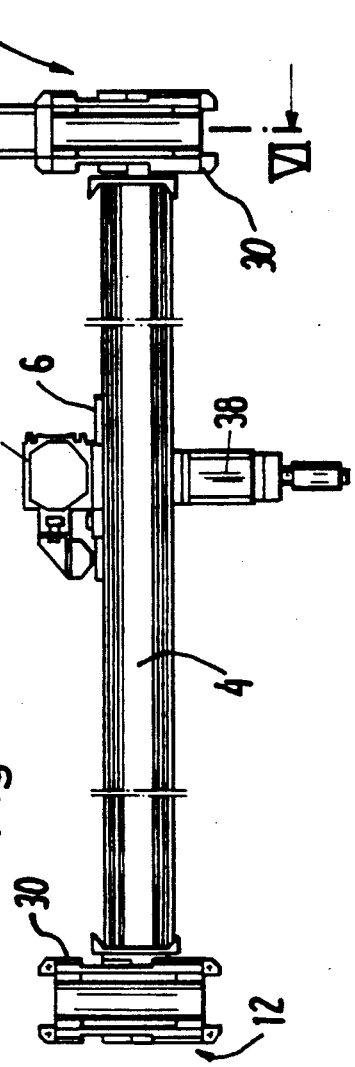

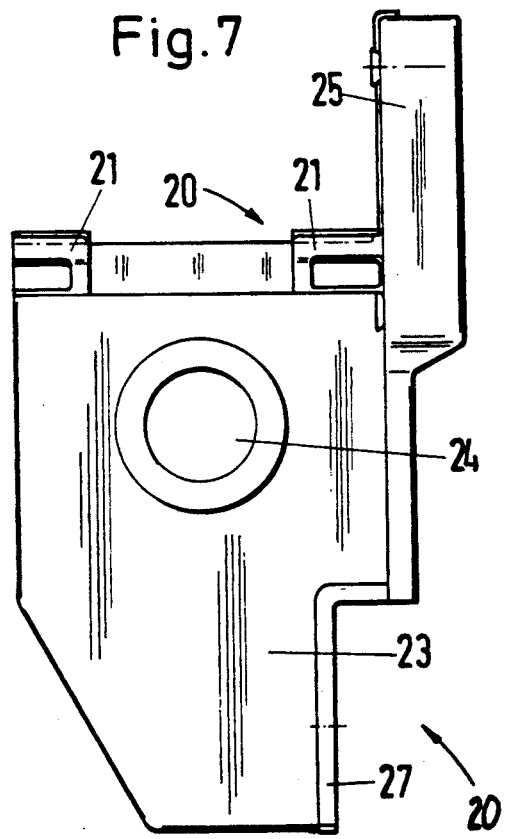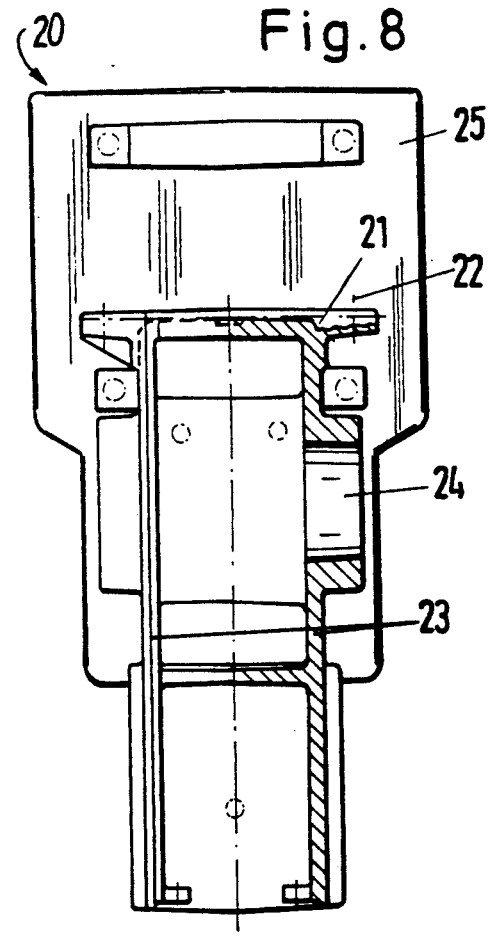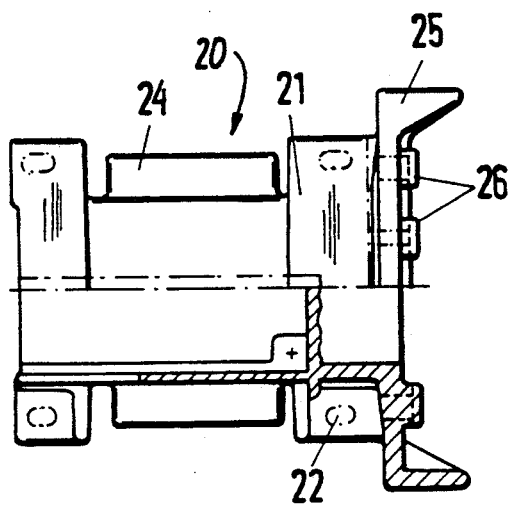

GUIDING A ROBOT IN AN ARRAY

BACKGROUND OF THE INVENTION

The present invention relates to a system for moving a robot manipulator or an industrial robot under utilization of a track system which includes longitudinal carriers and supports as well as lifting structure having load bearing capabilities.

Generally speaking the invention pertains to equipment of the kind shown e.g. in to U.S. Pat. No. 4,836,111. Further reference is made to a German patent 35 04 233. In these systems a lifting column or support structure is provided in such a system for being moved in a three dimensional array of positions. The support structure furnishes the two-dimensional positioning, the lifting/lowering of a manipulator adds to it the third dimension.

The particular lifting or lowering post has a gripping device and its movements are limited through the support structures arranged under or ahead of a carrier system which means that it must be designed in oversized dimensions to cover all parts that have to be reached. In simple terms, one has to cope in this fashion with the fact that physical structure gets in the way of mobile parts that are provided to reach any point in a given column space. That space must be reachable without obstruction and exactly that is the problem of support. The working range of the robot is therefore limited by these structures to the range covered by the support.

Of course the support in terms of longitudinal carriers, transverse rails, rail support etc. including the connection can be made i.e. constructed in terms of overall architecture in a variety of ways. Unfortunately this seems to preclude standardization. The manufacture of seemingly standardized parts still ends up with an unduly large inventory. In particular it seems that the structures are not of the kind which could be deemed a building block system from which one can assemble a variety of different systems along which and by means of which the robot can move. The invention serves as a remedy to this deplorable situation.

DESCRIPTION OF THE INVENTION

It is an object of the present invention to provide a new and improved guiding, controlling, supporting and rail systems for robot manipulators in such a manner that many parts are standardized so that a variety of combinations and rail systems can be assembled from such standardized parts.

In accordance with the preferred embodiment of the present invention, it is suggested to provide supports and a longitudinal carrier or carriers and to provide particularly end elements of a uniform kind. Such an element will either connect to two elements that meet at right angles at an intersection, or the end element will connect to one of the ends of a movable rail as well as to a carriage by means of which that movable rail runs on another rail. In addition the end element mounts a shaft for a drive such as a pinion or driven element that drives or turns back a bolt. It is therefore a specific aspect of the invention that these end elements are the same throughout the system and they serve also as stops or limits for the motion of the robot while they themselves provide the capability of mounting other drive elements.

In furtherance of the invention linear as well as areal support and rail systems for industrial robots, manipulators or the like are provided. They are on one hand comprised of longitudinal carriers, transverse carriers as well as transverse rails. These elements are in turn interconnected through standardized end elements. The longitudinal rail carriers carry in a mobile fashion a transverse movable rail on which in turn is drivingly mounted the lifting structure for the robot element. it can thus be seen that central to the system is the inventive end element being uniform regardless of the function and where and in what particular portion of the system it is used. It is therefore a part that can be made in an uniform fashion and can be mass produced in an economic manner.

Such an end element is provided basically with a connecting L for connecting from below to a transverse connection or to a carriage, and a lateral upright connects directly to an end of a longitudinal rail carrier or to an end of a movable rail. In addition there are downwardly oriented plates or sheets with aligned bearing bores for a variety of shafts. The end element moreover may be provided with connections for buffers or limiting stop in order to attenuate any impact of movable parts against only involving the respective transverse end element.

The basic drive element to be employed within the system is to be a toothed belt and being an engagement either with drive pinions or with reversing pinions and being connected on two whatever parts are supposed to move i.e. the lifting column with its carriage or the carriage for the transverse rail carrier. The drive motor for the movable transverse rail is preferably provided on one of the transverse connectors and connected in both directions with drive shafts for connection to drive pinions which in turn are mounted on end elements. In lieu of a traversing toothed belt one can use a rack connected to and being arranged under the various carrier whereby in this case the end elements are not provided with bearing functions. This, however, does not change the basic aspect under such circumstances; certain function of the end element namely that of mounting belt engaging pinion is just not used in that instance.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 shows a side view of a movable rail as shown in FIG. 1, the view being from a direction indicated by arrow X in FIG. 1;

FIG. 4 is a top view of the carrier shown in FIG. 3, the viewing direction being indicated as per IV in FIG. 3;

FIGS. 5 and 6 are respectively section views through lines V—V in FIG. 3 and VI—VI in FIG. 4;

FIG. 7 is a front view of an end element within the system shown in FIG. 1 but showing that end element on an enlarged scale;

FIG. 8 is a partial side elevation, partial section of the end element shown in FIG. 7;

FIG. 9 is a top elevation of the end element shown in FIG. 7, shown partially in section view;

Figure 1:
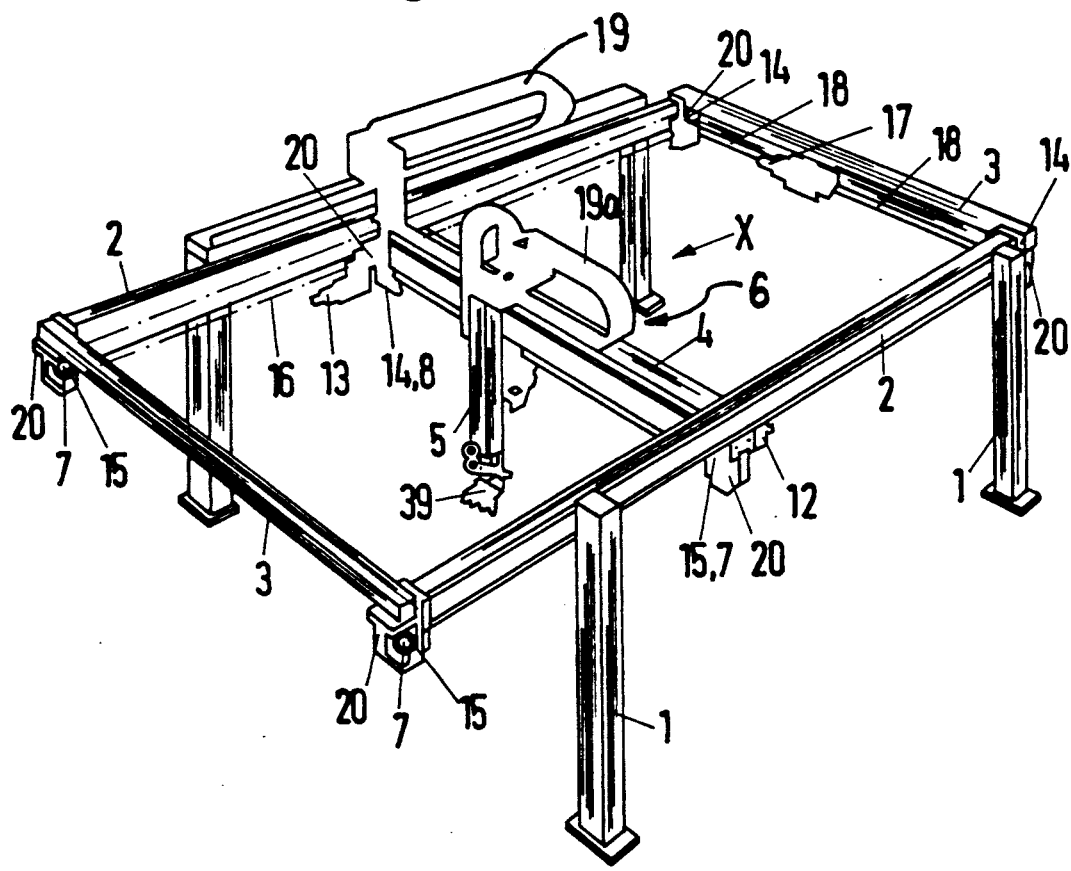
FIG. 1 is a perspective view of a robot system for placement of a manipulator in a three dimensional array incorporating a preferred embodiment of the present invention for practicing the best mode thereof.

The mounting and rail structure of an industrial robot as shown in FIG. 1 includes vertical support posts 1 for longitudinal rail carriers 2 which are interconnected at the end by means of transverse connectors 3, there being end elements 20 interposed which end elements constitute the main aspect of the present invention. The mode and manner of using these end pieces to selectively connect a rail carrier to a transverse connecting bar 3 will be described below. In addition a transverse movable rail 4 is provided as a device that has carriages 12 to run on the rails of carriers 2. Rail 4 itself serves as track for a carriage 6 on which is mounted a moving structure of and in a lifting column 5 with a load handling structure 39 such as a gripper or the like at the lower end of the column. The transverse movable rail 4 is movable along and on rails of the longitudinal carriers 2 which column 5 moves transversely on rail 4. Hence this combined portion places the gripper 39 into selected points within a three dimensional array.

Figure 2:
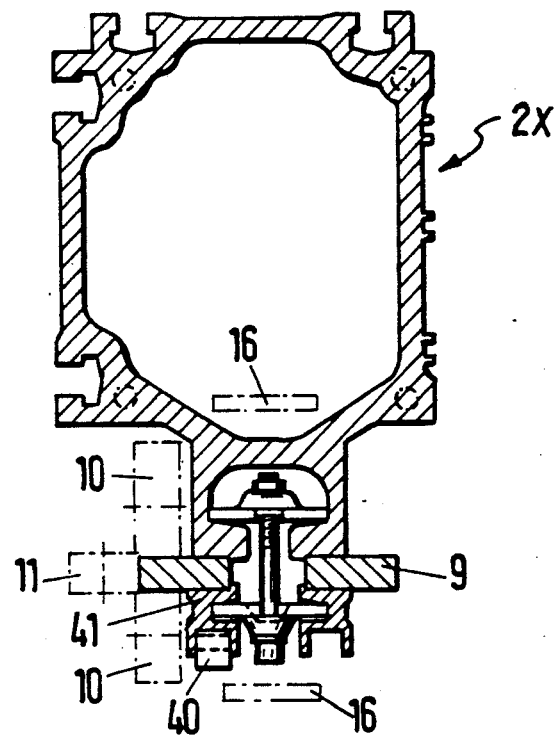
FIG. 2 is a cross section through either a longitudinal rail carrier or a movable rail used in the system shown in FIG. 1.

FIG. 2 shows a cross-section through a rail carrier 2 but the view is equally interpretable as a section through the movable rail 4. This carrier is of hollow construction and that continues the practice of the method set forth in the application above of common assignee (Ser. No. 071,634; filed: Jul. 9, 1987). Aside from the hollow construction 2x in an overall sense, the device 2x as such has bottom configuration that provides for rail service proper. The figure shows guide rails 9 attached to the bottom of the hollow for carrier rolls and support rolls 10 as well as for guide rollers 11 pertaining to a carriage 12 introduced above. If there is no traversing kind of drive then a clamping bar 41 is provided with a rack 40. The position of a toothed belt 16, if used, is indicated in a dash dot line. One stringer running in the hollow space of the carrier bar, the other stringer runs below that carrier. A particular one of the carriages 12 not only runs on a rail but carries also a drive motor, 13. The motor 13 drives the carriage 6 and the lifting column 5 thereon, so that the carriage can run on and along the transverse carrier 4. A drag cable 19 provides for the power supply of that drive 13.

Proceeding now to a more detailed description of the drawings, in FIGS. 3 and 6 a drive pinion 14 of motor 13 on one carriage 12 is mounted on one end element 20, here for rail 4, and drives the endless tooth belt 16 that pertains to the rail 4. This belt is fastened to carriage 6 of the lifting column 5. A belt reversing pinion 15 is mounted on a shaft 7 in the other end element 20 for carrier rail 4. The carrier 4 itself has its front end positioned in pocketlike uprights 25 of the respective end elements 20. The end elements 20 are shown in an enlarged scale in FIGS. 7-9; they are laterally connected in this one instance with the carrier rail 4 and are connected directly on the upper side to the carriages 12.

For driving the carrier rail 4 along rails 2 a motor such as 17 is for example fastened to one of the transverse connectors 3, in about the middle thereof. This motor 17 has an output transmission with shaft extensions 18 running in opposite directions rotation to of drive pinions 14. These pinions 14 are mounted in particular end elements 20 at the ends of the longitudinal carriers 2. A transverse connection 3 is now placed with its ends on top of two end elements 20 for rails 2. Another endless tooth belt 16 has one end connected to a carriage but in the opposite direction, loops around the drive pinion 14 and the respective deflection pinions 15 at the other end of the system respective rail 2 and the end element 20 thereat (see foreground of FIG. 1) to run back to end in the respective other side of carriage 12 arranged at one end of the transverse carrier rail 4. This arrangement is duplicated for the other rail 2 and the carriage 12 thereof.

As FIGS. 4 and 5 show, a motor 38 is fastened to carriage 6 or the transverse carrier rail 4. This motor 38 is provided for lowering and lifting the column 5 with its gripping element 39 at the end. Flexible cable 19a runs power to that motor 38, from one of the carriages 12 which carrier motor 13 and is through cable 19 connected to an external power supply.

An end element 20 is shown in detail in FIGS. 7, 8, 9. Connection plate 21 which is provided for connection to the transverse carrier 3. Plate 21 is provided with bores 22 for fastening elements. The two plate elements 23 are provided with aligned bores 24 for mounting a drive shaft 8 for motor 13, or 18 (motor 17) pinion 14 or the deflection shaft 7 for the deflection pinion 15, whatever the situation requires which of course depends on the location of the particular end element 20 and its contemplated use.

An end element 20 is furthermore provided with laterally projecting pocketlike upright element 25 which projects upward from the horizontal lasting plate 21. The connecting elements 21 and the upright bars 25 together constitute an L-shaped mounting element. One (21) for support of a carriage 12 or a transverse connector (3) from below, the other one (25) for end-on connection to a rail 4 or a rail carrier 2. Upright bar 25 is provided with bores 26 for connection either to an end of a longitudinal carrier 2 or to one end of transverse carrier rail 4 against whatever the situation requires. In order to avoid that the moving transverse carrier 4 run against an end element 20 it is provided with a surface 27 onto which is screwed a buffer or stop element 28 as shown in FIG. 3. Multiple stop elements 28 can be provided for safety reasons.

Figure 10:
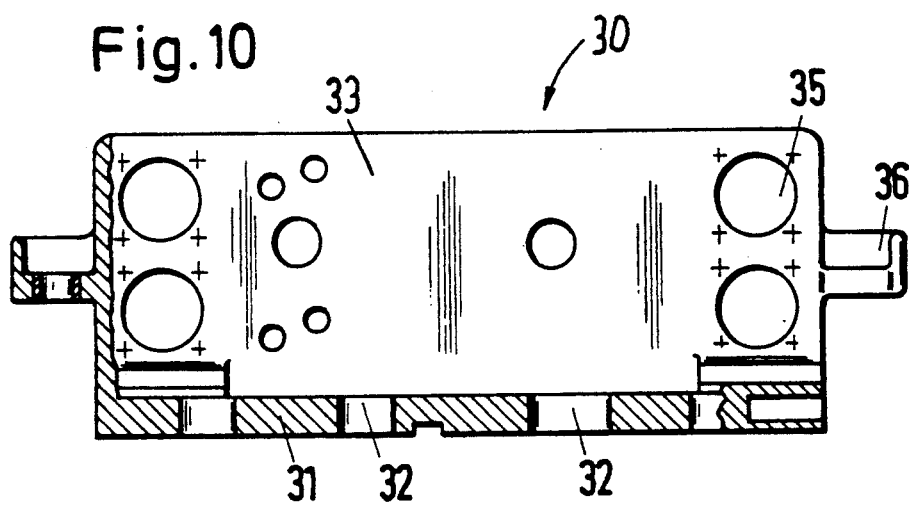
FIG. 10 is a roller carriage used in the system of FIG. 1 and shown in longitudinal section view.
Figure 11:
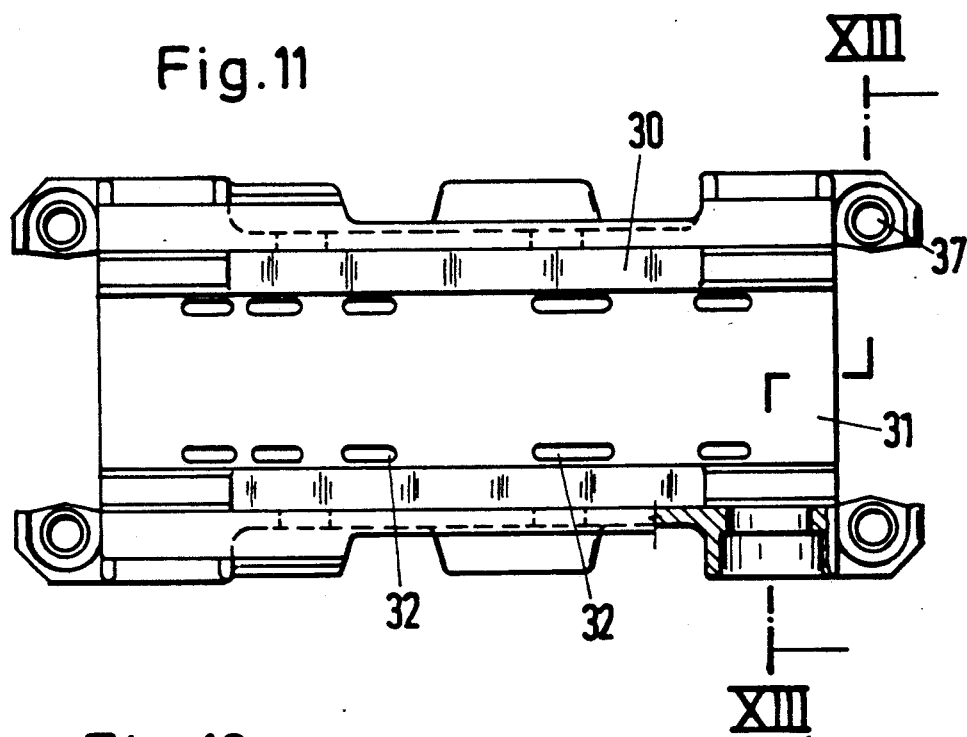
FIG. 11 is a top view of the carriage shown in FIG. 10.
Figure 12:
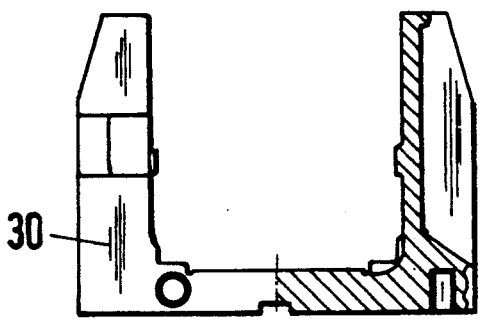
FIG. 12 is a front view of the carriage shown in FIG. 10, also shown partially in section.
Figure 13:
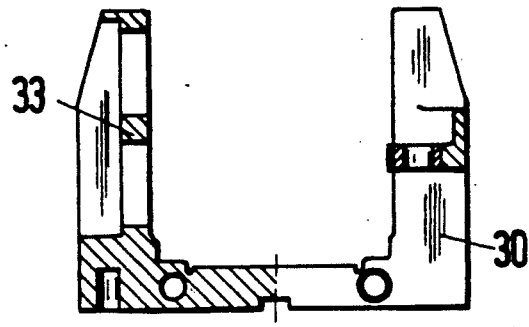
FIG. 13 shows a section view indicated by XIII through FIG. 11.

As outlined above, certain end elements connect a carrier 2 to connectors 3. As far as rail 4 is connected its end elements 20 carry, as shown in FIGS. 10 and 13, a roller frame 30 of the respective carriage 12. These carriages 12 as will be recalled cause at both ends the transverse carrier rail 4 to run on the respective longitudinal carrier rails 2. The frame 30 has a base plate 31 being provided with oblong slots 32 for connecting to bores 22 of the transverse plate 21 of the respective end element 20. In addition the end of the frame 30 includes a lateral wall 33 which in turn has bores 35 for the carrying and support rollers 10 of the carriage and there are bearing eyes 36 with bearing bores 37 provided for the guide rollers 11 of the carriage mentioned above with reference to FIG. 2.

Summarizing the functions the end element 20, it being of universal construction, it is provided, first of all, as connecting element between a longitudinal carrier 2 and a transverse connector 3, and this sets up the basic horizontal dimension of the frame of the system. In addition end elements 20 serve as connection between a carrier rail 4 and its carriages 12. In addition an end element 20 is provided as a bearing mount for a shaft 7 with its deflection pinion 15 or it can serve as a bearing mount for the drive shaft 8 with the belt driving pinion 14 and being driven by the motor 13 or the element 20 can serve as a bearing mount for the drive shafts 18 of motion 17 with the respective belt driving pinions 14. Finally as was just mentioned the element 20 will serve whereever the need arises as a carrier for the buffer 28.

The invention as explained above is particularly applicable for the two dimensional array and it can easily be seen that this array can be extended and widened in various ways under utilization of these particular end elements. On the other hand a single, linear kind of support system is possible in which the carriage 6 with lifting column 5 runs directly on a longitudinal carrier 2 in which case transverse elements 3 and 4 are not needed.

The invention is not limited to the embodiments described above but all changes and modifications thereof, not constituting departures from the spirit and scope of the invention, are intended to be included.

We claim:

1. A two dimensional mounting structure for an industrial robot, the robot being comprised of a carriage with a lifting post and a manipulator connected to the post, the mounting structure including longitudinal rail carriers, transverse connectors and a movable rail, there being carriage elements by means of which the movable rail runs on rails of the longitudinal rail carriers, the carriage for the robot running on the movable rail, the improvement comprising:

a plurality of essentially similarly constructed end elements, first ones of the end elements connecting the ends of the longitudinal rail carriers to the ends of the transverse connectors, others of the end elements connecting respective opposite ends of the movable rail to the carriage elements by means of which the movable rail runs on the longitudinal rail carriers; and wherein said end elements as connected to the ends of the movable rail are mounted underneath said carriage elements by means of which the movable rail runs on the longitudinal rail carriers.

2. The improvement as in claim 1 wherein each of the end elements being provided with a connection plate for connection to one of the transverse connectors or alternatively to one of the carriage elements further provided with an upright bar for connection to an end of one of the longitudinal rail carriers or alternatively the movable rail, and a pair of plates extending down from the first mentioned connection plate and being provided with aligned bores, as bearings for a pinion.

3. The improvement as in claim 1 wherein each of the end elements including an additional means for connection to a buffer.

4. A two dimensional mounting structure for an industrial robot, the robot being comprised of a carriage with a lifing post and a manipulator connected to the post, the mounting structure including longitudinal rail carries, transverse connectors and a movable rail, there being carriage elements by means of which the movable rail runs on rails of the longitudinal rail carriers, the carriage for the robot running on the movable rail, the improvement comprising:

a plurality of essentially similarly constructed end elements, first ones of the end elements connecting the ends of the longitudinal rail carriers to the ends of the transverse connectors, others of the end elements connecting respective opposite ends of the movable rail to the carriage elements by means of which the movable rail runs on the longitudinal rail carriers; each of the end elements being provided with a connection plate for connection to one of the transverse connectors or alternatively to one of the carriage elements further provided with an upright bar for connection to an end of one of the longitudinal rail carriers or the movable rail, and a pair of plates extending down from the first mentioned connection plate and being provided with aligned bores, as bearings for a pinion;

wherein of the two of said end elements connected to the ends of the movable rail (4) and to each of the longitudinal rail carriers (2), one of these two end elements having a reversing pinion, the other one of the two end elements being provided with a drive pinion; and a motor connected to the drive pinion, and one of the carriage and carriage element being connected to a belt that loops around both pinions.

5. The improvement as in claim 4, the motor for the pinions mounted on the end elements of the longitudinal rail carriers being mounted on one of the transverse connectors and having drive shaft means, the two end elements of the rail carriers that are connected to the one transverse connection being provided to journal the drive shaft means, the shaft means connected to drive pinions in said two end elements.

6. The improvement as in claim 4, the motor for driving the carriage being mounted on one of the carriage elements, the two of the end elements being connected to the movable rail, journalling respectively a drive pinion and a reversing pinion, the drive pinion being connected to the motor for driving the carriage.

7. The improvement as in claim 4, each belt running inside its respective movable rail and rail carrier as well as underneath thereof.

8. A two-dimensional mounting structure for an industrial robot, the robot being comprised of a carriage with a lifting post and a manipulator connected to the post, the mounting structure including longitudinal rail carriers, transverse connectors and a movable rail, there being carriage elements by means of which the movable rail runs on rails of the longitudinal rail carriers, the carriage for the robot running on the movable rail, the improvement comprising:

a plurality of essentially similarly constructed end elements, first ones of the end elements connecting the ends of the longitudinal rail carriers to the ends of the transverse connectors, others of the end elements connecting respective opposite ends of the movable rail to the carriage elements by means of which the movable rail runs on the longitudinal rail carriers;

each said end element comprising two flat plates with aligned bores, a connecting plate interconnecting the two plates from which they extend in downward direction, for connection to one of the transverse connectors or alternatively to one of the carriage elements a lateral upright bar extending upright from said connecting plate, parallel to said axis for connection to the front end of a longitudinal rail carrier or an end of the movable rail; and each said connecting plate connected to one of the transverse connectors being bolted from below to an end of the one connector, the upright bar being connected to an end of one of the longitudinal rail carriers.

9. A two-dimensional mounting structure for an industrial robot, the robot being comprised of a carriage with a lifting post and a manipulator connected to the post, the mounting structure including longitudinal rail carriers, transverse connectors and a movable rail, there being carriage elements by means of which the movable rail runs on rails of the longitudinal rail carriers, the carriage for the robot running on the movable rail, the improvement comprising:

a plurality of essentially similarly constructed end elements, first ones of the end elements connecting the ends of the longitudinal rail carriers to the ends of the transverse connectors, others of the end elements connecting respective opposite ends of the movable rail to the carriage elements by means of which the movable rail runs on the longitudinal rail carriers;

each said end element comprising two flat plates with aligned bores, a connecting plate interconnecting the two plates from which they extend in downward direction, for connection to one of the transverse connectors or alternatively to one of the carriage elements a lateral upright bar extending upright from said connecting plate, parallel to said axis for connection to the front end of a longitudinal rail carrier or an end of the movable rail; and each connecting plate connected to one of the carriage elements being connected from below and the upright bar being connected to one end of the movable rail.

* * * * *